United States Patent [19]
Ferguson

[11] 4,277,073
[45] Jul. 7, 1981

[54] INSERT TYPE SOFT CHUCK JAWS

[75] Inventor: Lyndel G. Ferguson, Comanche, Okla.

[73] Assignee: Halliburton Company, Duncan, Okla.

[21] Appl. No.: 82,845

[22] Filed: Oct. 9, 1979

[51] Int. Cl.³ ............................................. B23B 31/16
[52] U.S. Cl. .................. 279/1 SJ; 269/273; 279/123
[58] Field of Search ...................... 279/1 SJ, 1 L, 121, 279/123, 4, 5; 269/273; 407/41

[56] References Cited
U.S. PATENT DOCUMENTS

| | | | |
|---|---|---|---|
| 3,679,221 | 7/1972 | Behrens | 279/1 SJ |
| 4,045,039 | 8/1977 | Pope et al. | 279/123 |
| 4,164,380 | 8/1979 | Peters | 407/41 X |

Primary Examiner—Z. R. Bilinsky
Attorney, Agent, or Firm—John H. Tregoning; James R. Duzan

[57] ABSTRACT

A soft chuck jaw comprising a hardened jaw body having a wedge locking means thereon and an insert of soft expendable material retained therein.

4 Claims, 4 Drawing Figures

INSERT TYPE SOFT CHUCK JAWS

The present invention relates to insert type chuck jaws for machining operations.

Expendable chuck jaws, commonly known as soft chuck jaws since they are fabricated from readily machinable materials, are used in industry for machining operations where concentricity is critical in the part being machined. Typically, soft chuck jaws are machined to have locating and retaining devices, such as keys, keyways, serrations, tapped holes, etc., to mate with various chucks. After machining, the jaws are then assembled or fitted on a compatible chuck of a machine tool, such as a lathe or grinder, and machined to the desired gripping diameter for the part to be machined. By machining the gripping surfaces on the soft chuck jaws after they have been assembled or fitted on the chuck, the concentricity of the part to be machined which is being held in the jaws is ensured.

Although concentricity requirements of the part being machined necessitates the use of soft chuck jaws, their use is costly. The cost stems mainly from the various chuck configurations for locating the soft chuck jaws thereon. Presently, typical soft chuck jaws involve extensive machining operations during manufacture requiring close tolerances for the locating and retaining devices. Variations in chuck configurations require the manufacture and stocking of many types of soft chuck jaws to support a wide variety of manufacturing operations. Typically, changing or relocating the soft chuck jaws on the chuck of the machine tool requires the complete removal of retaining bolts securing the jaws to the chuck. Also, since changing of the soft chuck jaws usually consumes several minutes, this often causes machine operators to machine excessive material from the jaws installed on the machine tool rather than installing the correct size jaw or relocating the jaws.

A solution to the problems associated with soft chuck jaws is to provide a hardened jaw body which is compatible with a particular chuck and which contains a soft piece of expendable material which can be machined to the desired diameter.

Such a soft chuck jaw comprising a hardened jaw body and an insert of a piece of soft expendable material is currently commercially available from Startwood Enterprises, Inc. of Broomfield, Colo. However, such a soft chuck jaw has the disadvantage of having the insert retained on the hardened jaw body by means of a dovetail slot. The machining of the dovetail slot in the hardened jaw body and matching dovetail lug on the insert requires careful and expensive machining operations during the manufacture of the soft chuck jaws, thereby raising manufacturing costs.

In contrast to the prior art soft chuck jaw, the present invention is directed to a soft chuck jaw comprising a hardened jaw body having a wedge locking means thereon and an insert of soft expendable material retained therein. By utilizing a hardened jaw body having a wedge locking means thereon, the insert, which is expendable, may be formed from cold formed stock material which has the required surface accuracy, thus merely requiring the cold formed stock material to be cut to the desired length and be square on one cut edge. The inserts are thereby interchangeable regardless of the various chuck configurations.

The foregoing advantages of the present invention will be more fully understood in conjunction with the following drawings and description thereof.

Figure 1:
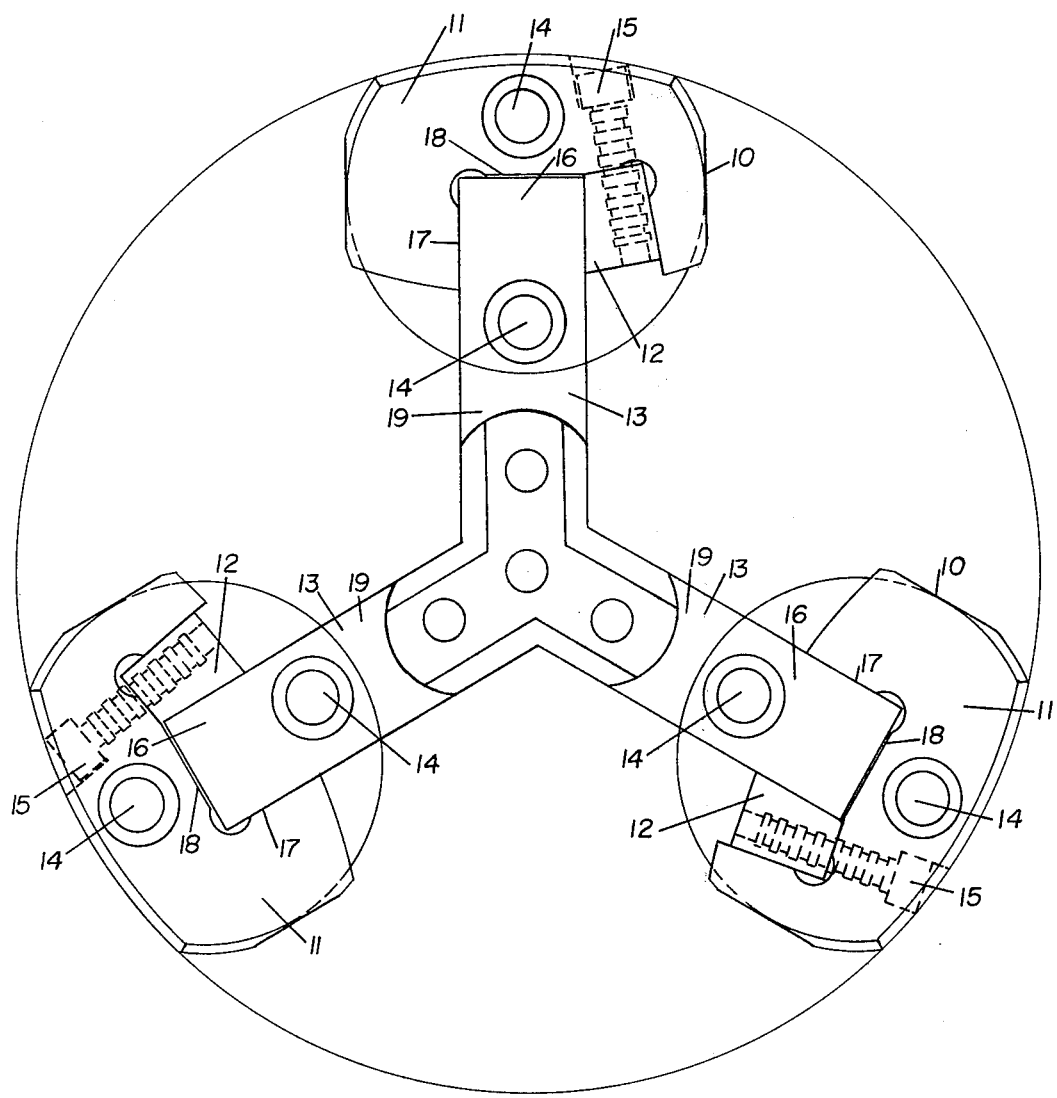
FIG. 1 is a top view of the present invention installed on the chuck of a machine tool.

Referring to FIG. 1, the present invention is shown in its preferred embodiment. A plurality of soft chuck jaws 10 are shown mounted on a chuck 1 of a machine tool (not shown).

The soft chuck jaw 10 comprises a hardened jaw body 11 having wedge locking means 12 retained thereon and soft jaw insert 13.

The hardened jaw body 11 is secured to the chuck 1 by threaded fasteners 14 while wedge locking means 12 is retained on the hardened jaw body 11 by threaded fastening means 15.

The soft jaw insert 13 comprises substantially rectangular body means having end portion 16 retained in the hardened jaw body 11 by being cammed into engagement with surfaces 17 and 18 of the hardened jaw body 11 by wedge locking means 12 while end portion 19 of the insert 13 extends beyond hardened jaw body to engage a work piece to be machined on the machine tool chuck 1 and has been machined to the desired diameter of the work piece to be engaged thereby. The soft jaw inserts 13 may be fabricated from any suitable rectangular shaped material having the desired degree of surface accuracy, such as cold formed bar stock, and being squared on one cut edge for mating with the hardened jaw body 11.

Figure 2:
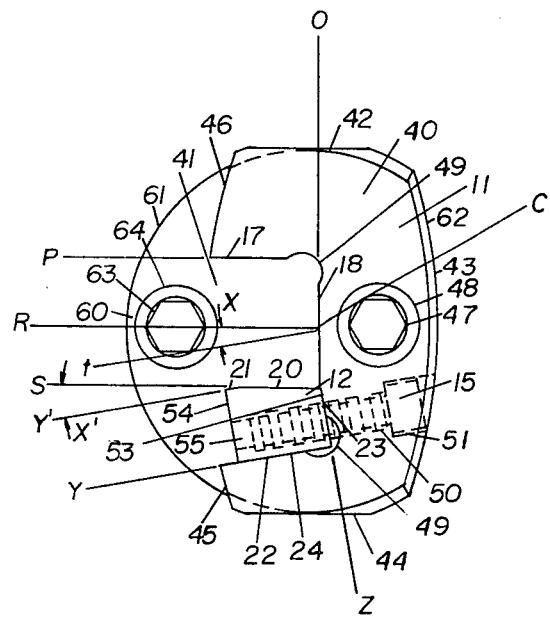
FIG. 2 is a top view of the present invention without the insert member.

Referring to FIG. 2, the hardened jaw body 11 is shown without the soft jaw insert 13 being retained therein. The hardened jaw body 11 is formed having a base portion 60 and having an upper portion 40.

For convenience, the base portion 60 is formed having cylindrical surface 61 terminating in curved surface 62. Cylindrical surface 61 is formed about geometric center C of the hardened jaw body 11. The base portion 60 is also formed having bore 63 therethrough and counterbore 64 therein which are utilized to accept suitable fastening means, such as threaded fasteners 14 (See FIG. 1), to secure the hardened jaw body 11 to the chuck of a machine tool.

Upper portion 40 of the hardened jaw body 11 is formed having substantially U-shaped opening 41 therein for mating with the squared one cut edge of the soft jaw insert 13 (not shown) formed by surfaces 17, 18, 23 and 22. The exterior surfaces of the upper portion 40 comprise 42, 43, 44, 45 and 46. The upper portion 40 also contains bore 47 therethrough and counterbore 48 therein which are utilized to accept suitable fastening means, such as threaded fasteners 14 (See FIG. 1), to secure the hardened jaw body 11 to the chuck of a machine tool. Also, the corners 49 of the substantially U-shaped opening 41 in the upper portion 40 are radiused to help prevent stress concentrations from occurring therein and to provide for corner clearance in accepting the soft jaw insert 13. Upper portion 40 further contains a plurality of bores 50 and counterbores 51 which extend from exterior surface 62 to surface 23 of the U-shaped portion 41. The bores 50 and counterbores 51 receive threaded fastening means 15 therein which extend into wedge locking means 12. It should be noted that any desired number of fastening means 15 may be utilized to retain the wedge locking means 12 on the hardened jaw body 11.

The wedge locking means 12 comprises a generally rectangular shaped member having side surfaces 20 and 24, substantially parallel end surfaces 53 and 54, substantially parallel top surface 55 and bottom surface (not shown), and threaded bores 56 therein receiving threaded fastening means 15 therein to slidingly advance the wedge locking means 12 with respect to the hardened jaw body 11.

As further shown in FIG. 2, plane P which extends through surface 17 of the hardened jaw body 11, plane R which extends through the center of hardened jaw body 11 and plane S which extends through surface 20 of wedge locking means 12 are mutually parallel. As further shown, plane t which passes through the geometric center of hardened jaw body 11 but is located at an angle x with respect to plane R, plane y' which intersects with plane S at corner 21 of wedge locking means 20, forms angle x' with respect to plane S, and is parallel to surface 22 of wedge locking means 12, and plane y which extends through surface 22 of hardened jaw body 11 are mutually parallel. It should be noted that plane O which extends through surface 18 of hardened jaw body 11 is substantially perpendicular to plane P while plane Z which extends through surface 23 of hardened jaw body 11 is preferably substantially perpendicular to plane y, although it may be formed at a variety of angles with respect to plane y. It should also be noted that angles x and x' are equal.

From the foregoing discussion, it should be evident that surface 22 of the hardened jaw body 11 is formed at an angle x with respect to surface 17 of the hardened jaw body 11 while surface 23 of the hardened jaw body 11 is also preferably formed at substantially the angle x with the respect to surface 18, although it may be formed at a variety of angles with respect to surface 18, of the hardened jaw body 11. It should be further evident that plane O and plane Z are also formed at angle x with respect to each other.

As evident from the foregoing discussion, when the wedge locking means 12 is retained on the hardened jaw body 11 with surface 24 of the wedge locking means 12 slidingly engaging surface 22 of the hardened jaw body 11, surface 24 of the wedge locking means 12 is substantially parallel to surface 17 of the hardened jaw body 11 and as wedge locking means 12 is moved along surface 22, the jaw insert 13 will be engaged by surfaces 20 and 17 thereby being retained therebetween.

It should be understood that the angle x, the included angle between planes R and t, can be any desired angle for manufacturing convenience and the desired opening width variation for opening 41 in the hardened jaw body 11; however, an angle of ten degrees (10°) is preferred.

It should also be understood that the hardened jaw body may be fabricated from any high strength material having high strength and wear resistance properties or may be fabricated from any material which may be metallurgically treated to have high strength and wear resistance properties.

Figure 3:
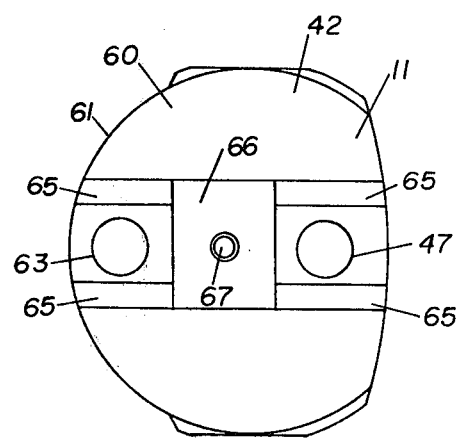
FIG. 3 is a bottom view of the present invention.

Referring to FIG. 3, the bottom of the base portion 60 of the hardened jaw body 11 is shown. The bottom of the base portion 60 is formed having projecting lugs 65 thereon and recess 66 therein. In the center of recess 66 is a tapped blind hole 67.

The projecting lugs 65 and recess 66 in the base portion 60 of the hardened jaw body 11 are adapted to mate with various industry standard chucks of machine tools, although some modifications of the lugs 65 and recess 66 may be required (not shown), such as American Standard tongue and groove chucks, American Acme serrated chucks, American Square serrated chucks and European Fine serrated chucks when the proper master keys are utilized therewith.

Figure 4:
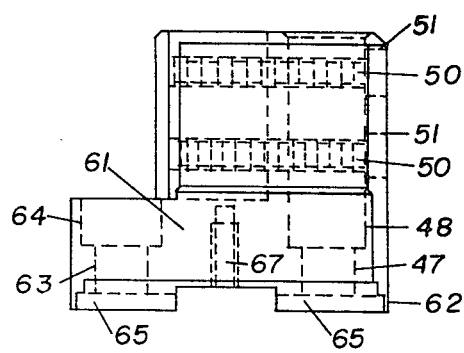
FIG. 4 is a side view of the present invention without the insert member.

Referring to FIG. 4, the hardened jaw body 11 of the present invention is shown in side view. The plurality of holes 50 through which threaded fastening means 15 extend into wedge locking means 12. Also shown are bore 63 and 47 and counterbores 64 and 48 through which threaded fastening means 14 (not shown) pass and extend into chuck 1 (not shown) of a machine tool.

From the foregoing specification and drawings, it can be seen that the present invention offers several unique advantages.

The soft jaw inserts which are expendable can be formed from cold formed materials which have the required surface accuracy needing only to be cut to the desired length and be squared on one cut edge.

The soft jaw inserts can be made interchangeable with a variety of chuck configurations.

Changing of the soft chuck jaws require only the loosening of the threaded fastening means extending from the hardened jaw body into the wedge locking means.

The hardened jaw body can be made of high strength materials and heat treated to have a high surface hardness to prevent wear.

The hardened jaw body shape is simple to machine having no difficulty to form machine surfaces thereon which would affect the accuracy of the assembled soft chuck jaws.

The soft chuck jaws are inexpensive to fabricate.

The soft jaw inserts are interchangeable on various size soft chuck jaws.

The soft chuck jaws require less setup time during installation on the chuck of a machine tool.

Having completed the description of the invention illustrated herein, it will be apparent to persons skilled in the art to make modifications thereto without departing from the spirit and scope of the invention. Accordingly, it is contemplated that the invention not be limited to the particular details illustrated herein except as defined by the appended claims.

What is claimed is:

1. A soft chuck jaw adapted to engage the chuck of a machine tool comprising:
    hardened jaw body means including:
        base portion means;
        upper portion means having a substantially U-shaped opening therein, wherein the substantially U-shaped opening comprises:
            first side wall means;
            second side wall means angularly disposed with respect to the first side wall means; and
            bottom wall means having a portion thereof disposed substantially perpendicular with respect to the first side wall means and having the remaining portion thereof disposed substantially perpendicular with respect to the second side wall means;
    lug means disposed on the bottom of the base portion of the hardened jaw body means adapted to engage the chuck of a machine tool;

recess means disposed between the lug means disposed on the bottom of the hardened jaw body means;

aperture means located in the remaining portion of the bottom wall means of the upper portion means, the aperture means being disposed substantially parallel to the second side wall means of the substantially U-shaped opening in the upper portion means;

aperture means extending through the base portion means and one of the lug means disposed on the bottom of the base portion means;

aperture means extending through the raised portion means, through the base portion means, and through one of the lug means disposed on the bottom of the base portion means; and aperture means located in the recess means disposed between the lug means disposed on the bottom of the hardened jaw body means, extending into the base portion means and having thread means on a portion thereof;

wedge locking means slidably engaging the second wall means of the substantially U-shaped opening in the raised portion of the hardened jaw body means, the wedge locking means comprising:

wedge shaped means having a first side wall portion substantially parallel to the first side wall means of the substantially U-shaped opening in the raised portion means in the hardened jaw body means, having a second side wall portion substantially parallel to the second side wall means of the substantially U-shaped opening in the raised portion means of the hardened jaw body means, having end wall portions substantially parallel with respect to each other, having top and bottom wall portions substantially parallel with respect to each other, and having aperture means therein substantially parallel to the second side wall means of the substantially U-shaped opening in the raised portion means of the hardened jaw body means;

soft jaw insert means releasably retained in the substantially U-shaped opening in the raised portion means of the hardened jar body means, the soft jaw insert means comprising:

substantially rectangular body means having one end portion releasably retained in the substantially U-shaped opening of the raised portion means of the hardened jaw body means by the wedge locking means while the other end thereof extends beyond the raised portion means of the hardened jaw body means whereby the soft jaw insert means is releasably clampingly engaged by the wedge locking means and the hardened jaw body means; and fastening means releasably securing the wedge locking means to the raised portion means of the hardened jaw body means and extending through the aperture means located in the raised portion means of the hardened jaw body means into the aperture means in the wedge locking means.

2. The soft chuck jaw of claim 1 wherein the base portion means comprises:

base portion member means having an upper surface, a bottom surface, a cylindrical side wall suface having as its center the geometric center of the hardened jaw body means and a curved side wall surface.

3. The soft chuck jaw of claim 2 wherein each lug means of the lug means disposed on the bottom of the base portion of the hardened jaw means has first and second projecting lugs thereon having a recess therebetween.

4. A soft chuck jaw adapted to engage the chuck of a machine tool comprising:

hardened jaw body means including:

base portion means comprising:

base portion member means having an upper surface, bottom surface, a cylindrical side wall surface having as its center the geometric center of the hardened jaw body means, and a curved side wall surface;

upper portion means having a substantially U-shaped opening therein, wherein the substantially U-shaped opening comprises:

first side wall means;

second side wall means angularly disposed with respect to the first side wall means; and bottom wall means having a portion thereof disposed substantially perpendicular with respect to the first side wall means and having the remaining portion thereof disposed substantially perpendicular with respect to the second side wall means;

lug means disposed on the bottom of the base portion of the hardened jaw body means adapted to engage the chuck of the machine tool, each lug means having first and second projecting lugs thereon having a recess therebetween;

recess means disposed between the lug means disposed on the bottom of the hardened jaw body means;

aperture means located in the remaining portion of the bottom wall means of the upper portion means, the aperture means being disposed substantially parallel to the second side wall means of the substantially U-shaped opening in the upper portion means;

aperture means extending through the base portion means and one of the lug means disposed on the bottom of the base portion means;

aperture means extending through the raised portion means, through the base portion means, and through one of the lug means disposed on the bottom of the base portion means; and aperture means located in the recess means disposed between the lug means disposed on the bottom of the hardened jaw body means, extending into the base portion means and having thread means on a portion thereof;

wedge locking means slidably engaging the second wall means of the substantially U-shaped opening in the raised portion of the hardened jaw body means, the wedge locking means comprising:

wedge shaped means having a first side wall portion substantially parallel to the first side wall means of the substantially U-shaped opening in the raised portion means in the hardened jaw body means, having a second side wall portion substantially parallel to the second side wall means of the substantially U-shaped opening in the raised portion means of the hardened jaw body means, having end wall portions substantially parallel with respect to each other, having top and bottom wall portions substantially parallel with respect to each other, and having aperture means therein substantially parallel to the second side wall means of the substantially U-shaped opening in the raised portion means of the hardened jaw body means;

soft jaw insert means releasably retained in the substantially U-shaped opening in the raised portion means of the hardened jaw body means, the soft jaw insert means comprising:

substantially rectangular body means having one end portion releasably retained in the substantially U-shaped opening of the raised portion means of the hardened jaw body means by the wedge locking means while the other end thereof extends beyond the raised portion means of the hardened jaw body means whereby the soft jaw insert means is releasably clampingly engaged by the wedge locking means and the hardened jaw body means; and fastening means releasably securing the wedge locking means to the raised portion means of the hardened jaw body means and extending through the aperture means located in the raised portion means of the hardened jaw body means into the aperture means in the wedge locking means.

* * * * *